(12) United States Patent
Markley

(10) Patent No.: US 6,716,124 B2
(45) Date of Patent: Apr. 6, 2004

(54) HYDRAULIC TENSIONER WITH IMPROVED PRESSURE RELIEF VALVE REACTIVE TO PEAK OPERATING LOADS

(75) Inventor: George L. Markley, Montour Falls, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/725,552

(22) Filed: Nov. 29, 2000

(65) Prior Publication Data

US 2002/0065159 A1 May 30, 2002

(51) Int. Cl.[7] ................................................. F16H 7/08
(52) U.S. Cl. ........................ 474/110; 474/109; 474/112
(58) Field of Search ................................. 474/110, 101, 474/109, 111, 112; F16H 7/08, 7/22

(56) References Cited

U.S. PATENT DOCUMENTS

| | | | | |
|---|---|---|---|---|
| 3,959,898 A | * | 6/1976 | McWatters | 188/268 |
| 4,507,103 A | | 3/1985 | Mittermeier | 474/110 |
| 4,881,927 A | | 11/1989 | Suzuki | 474/110 |
| 5,352,159 A | * | 10/1994 | Suzuki et al. | 474/110 |
| 5,577,970 A | | 11/1996 | Smith et al. | 474/110 |
| 5,700,213 A | * | 12/1997 | Simpson et al. | 474/110 |
| 5,707,309 A | | 1/1998 | Simpson | 474/110 |
| 5,879,256 A | | 3/1999 | Tada | 474/110 |
| 5,993,342 A | | 11/1999 | Wigsten et al. | 474/110 |
| 6,139,454 A | * | 10/2000 | Simpson | 474/110 |
| 6,193,623 B1 | * | 2/2001 | Koch et al. | 474/110 |
| 6,322,468 B1 | * | 11/2001 | Wing et al. | 474/110 |

* cited by examiner

*Primary Examiner*—Marcus Charles
(74) *Attorney, Agent, or Firm*—Fitch, Even Tabin & Flannery; Greg Dziegielewski

(57) ABSTRACT

A hydraulic tensioner having in combination a pre-loaded biasing system for a secondary piston to reduce the operating loads in a drive chain or belt system at or near the maximum limit of the prescribed range for the tensioner and a pressure relief system to quickly relieve hydraulic pressure when the operating loads exceed the maximum limit of the prescribed range. The pressure relief system is opened when the secondary piston is forced to move independently of and toward the primary piston a predetermined stroke amount. Once the pressure relief system is opened, hydraulic fluid is discharged from the chamber to allow the tensioner to temporarily release tension on the chain or belt system. When the operating loads reduce below the maximum limit, the secondary piston moves to its normal operating range and the pressure relief system closes to allow the tension to return to its normal operating state.

13 Claims, 3 Drawing Sheets

HYDRAULIC TENSIONER WITH IMPROVED PRESSURE RELIEF VALVE REACTIVE TO PEAK OPERATING LOADS

FIELD OF THE INVENTION

The present invention relates to hydraulic tensioners used with chain or belt drive systems, such as timing systems for internal combustion engines, and, more particularly, to hydraulic tensioners with a pre-loaded biasing effect to reduce peak operating loads of the system as they approach and achieve the maximum limit of a prescribed range for the tensioner and a pressure relief valve to provide relief from peak operating loads of the system that exceed the maximum limit of the prescribed range for the tensioner.

BACKGROUND OF THE INVENTION

Hydraulic tensioners are typically used as a tension control device for chain or belt drive system, such as a timing system for an internal combustion engine. The tension in the chain or belt may vary greatly due to the wide variation in the temperature and the thermal expansion among the various parts of the drive system and any system along with which it operates. Thus, tensioners are used to impart and maintain a certain degree of tension on the chain or belt to prevent slippage from elongation and noise.

More specifically, for example, the timing chain system for internal combustion engines typically includes a chain that wraps about two spaced sprockets, which are commonly referred to as a crankshaft sprocket and a camshaft sprocket. In addition to temperature and thermal expansion effects caused by the engine, camshaft and crankshaft induced torsional vibrations can cause the chain tension to vary considerably. Reduction in chain tension also results from chain elongation and wear to the parts through prolonged use. Chain elongation can cause undesirable noise and slippage, which can possibly cause serious damage to the engine and other components by altering the camshaft timing by several degrees. Thus, it is important to impart and maintain appropriate tension on the chain to take up slack due to elongation to prevent slippage of the chain about the sprockets and noise.

Hydraulic tensioners typically include a housing having a bore, a fluid chamber defined by the bore and a hollow piston biased outward of the bore by a spring. A check valve is provided to permit fluid flow from a source of pressurized fluid into the fluid chamber, while preventing back flow in the reverse direction. The spring and the hydraulic pressure in the housing force the piston outward to impart and apply tension against the chain or belt to take up the appropriate amount of slack.

When the piston tends to move in the reverse direction, the check valve closes to restrict outflow of the fluid from the chamber. Although a small clearance between the piston and the housing wall may permit small amounts of the fluid to escape, the tensioner achieves a so-called "no-return function" because the piston is virtually unable to retract. The no-return function presents potential problems for the hydraulic tensioner when tension spikes or surges in the chain or belt are encountered during operation. For example, when the timing system operates at its resonant frequency, the chain load increases significantly, and in many cases approaches (and in some cases can even exceed), the maximum limit of the prescribed range of operation for the tensioner. The small clearance between the piston and the housing wall is insufficient to quickly release the hydraulic fluid from the chamber to accommodate the sudden overload on the tensioner by the chain or belt.

An example of a tensioner directed to addressing operating loads at the maximum limit of the prescribed range is disclosed in Wigsten et al., U.S. Pat. No. 5,993,342, which is commonly owned by the assignee of this application. Wigsten et al. discloses a hydraulic tensioner with a pre-loaded limiting feature, such as a spring, at the upper end of the piston to reduce the peak operating loads in a chain system. The spring member is located between the primary piston and an upper secondary piston. This design works well to reduce the peak operating loads in the system up to the maximum limit of a prescribed range for a tensioner. As mentioned, there are instances, however, where the chain system produces peak operating loads beyond the realistic prescribed range to be accommodated by the tensioner. Thus, there is a need for the tensioner to be able to address these excessive loads and provide temporary relief.

An example of a tensioner directed to addressing operating loads at the maximum limit of the prescribed range is disclosed in Suzuki, U.S. Pat. No. 4,881,927. Suzuki discloses a hydraulic ball-type check valve tensioner having a piston slidably fitted into a primary chamber and biased by a spring in a protruding direction. This tensioner includes a relief valve having a sleeve slidably fitted in an auxiliary chamber in communication with the primary chamber, with a spring biasing the sleeve into a depressed position to block a discharge port. Hydraulic fluid in the primary chamber flows into the auxiliary chamber to force the sleeve against the biasing spring action to unblock the discharge port. A shortcoming with this design is the potential for the relief valve to open and close slowly due to the relatively high mass of the components and the variable friction between the sleeve and auxiliary chamber wall. This shortcoming also may cause the pressure at which the relief valve operates to vary and otherwise be inconsistent.

Accordingly, there is a need for an improved tensioner that not only addresses operating loads as they approach and achieve the maximum limit of the prescribed range to provide a constant tensioning force, but that also addresses operating loads that exceed the maximum limit of the prescribed range in an effective and efficient manner to provide temporary relief from the no-return function to prevent damage to the tensioner and the drive system.

SUMMARY OF THE INVENTION

The present invention relates to hydraulic tensioners used with chain or belt drive systems, such as timing systems for internal combustion engines, and includes a pressure relief valve to provide relief from peak operating loads of the system that exceed the maximum limit of the prescribed range for the tensioner. The hydraulic tensioner includes a housing defining a bore and a primary piston slidably received within the bore. The primary piston defines a fluid chamber with the bore and has a lower end defining a first opening and an upper end defining a second opening.

The hydraulic tensioner further includes a secondary piston that extends through the second opening of the primary piston. The secondary piston includes a base portion and an upper end portion. The base portion is disposed in the primary piston and the upper end portion is spaced from the base portion and the primary piston. The secondary piston is permitted to move axially with respect to the primary piston.

A first biasing member is located within the bore to bias the primary piston outwardly of the bore. A second biasing member is located between the primary piston and the upper end portion of the secondary piston to bias the secondary piston away from the primary piston.

A first valve is provided between the fluid chamber and a source of pressurized fluid to permit fluid flow into the chamber while blocking flow in the reverse direction. A passage in the housing connects the fluid chamber with the source of pressurized fluid. A second valve discharges fluid flow from the chamber through the second opening of the primary piston to reduce hydraulic pressure in the chamber when the secondary piston moves axially towards the primary piston a predetermined stroke amount due to operating loads acting on the tensioner exceeding a maximum limit of a prescribed range for the tensioner.

The second biasing member also may be compressed a predetermined amount when interposed between the primary piston and the upper end portion of the secondary piston. The second biasing member may be further compressed when the operating load on the secondary piston exceeds a predetermined amount within the prescribed range of operation.

The second valve may further include a recess defined by a portion of the secondary piston between the base portion and the upper end portion. Thus, the second valve would be in an open position when the recess is located across the second opening of the primary piston when the operating load on the secondary piston moves the piston axially toward the primary piston the predetermined stroke amount due to operating loads exceeding the maximum limit of the prescribed range of operation so to discharge fluid from the chamber to reduce hydraulic pressure in the chamber. Since the secondary piston is capable of moving axially, the second valve is closed when the recess moves so that it is not across the second opening of the primary piston under the pressure of fluid flow into the chamber and the bias of the first and second biasing members when the operating loads reduce below the maximum limit of the prescribed range for the tensioner.

The hydraulic tensioner may further include a nose piece attached to the upper end portion of the secondary piston with the second spring being interposed between the primary piston and the nose piece. Further, the upper end portion of the secondary piston may have a threaded portion and the nose piece may define a bore with internal threading that complements the threaded upper end portion for attaching the nose piece to the upper end portion of the secondary piston.

The first biasing member may be a coil spring interposed between the upper end of the primary piston and the housing to bias the primary piston outward of the housing. The second biasing member may be a coil spring, a plurality of Belleville washers, a resilient material or compressed air interposed between the upper end portion of the secondary piston and the upper end of the primary piston to bias the secondary piston away from the primary piston.

BRIEF DESCRIPTION OF THE DRAWINGS

The following detailed description of the preferred embodiment of a hydraulic tensioner embodying the present invention will be described in connection with the following described drawings, wherein.

DETAILED DESCRIPTION OF THE PREFERRED EMBODIMENTS

Figure 1:
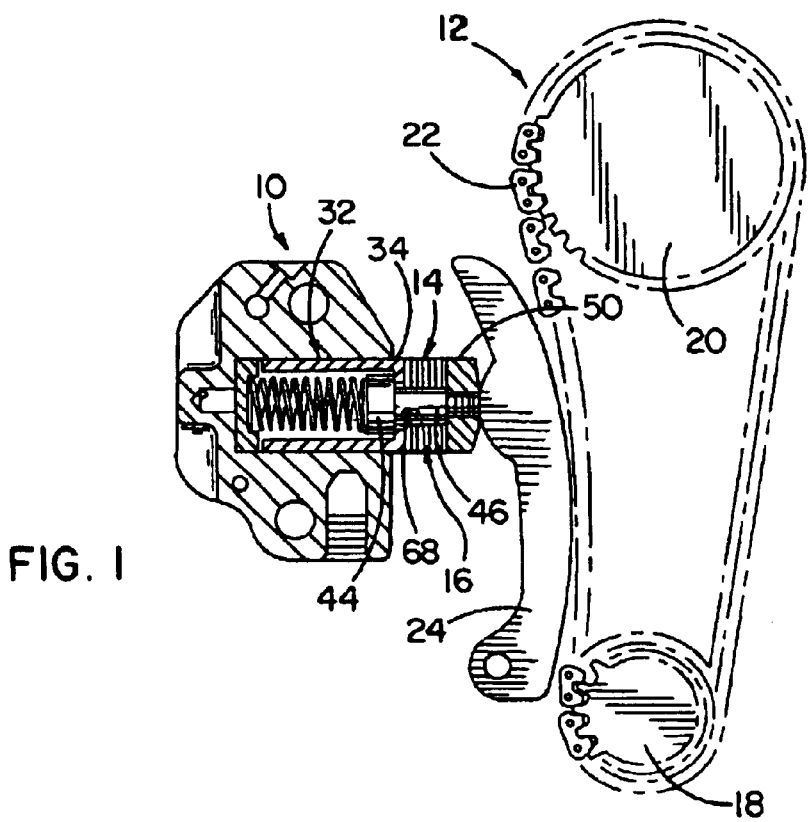
FIG. 1 is side elevational view of a hydraulic tensioner embodying the present invention and illustrated in combination with a drive system, such as a timing chain system used with an internal combustion engine.

With reference to FIG. 1, the present invention is embodied in a tensioner 10 used as a tension control device for a chain or belt drive system 12. The tensioner 10 includes a pre-loaded biasing system 14 and a pressure relief system 16 to address operating loads of the chain drive system 12 that approach and exceed the maximum limit of the prescribed range for the particular tensioner 10. The pressure relief system 16 enables the tensioner to quickly and temporarily remove loading against the chain drive system 12 when the operating loads of the drive system 12 exceed the maximum limit of the prescribed range for the tensioner 10. This prevents interference by the tensioner 10 on the operation of the drive system 12 and potential for damage to the tensioner 10 and the drive system 12.

A typical chain drive system 12, such as a timing chain system commonly used in connection with an internal combustion engine, includes a crank sprocket 18, a cam sprocket 20, a chain 22 about the crank and cam sprockets 18, 20, and a pivotal tensioner 24 arm to engage the chain 22. The tensioner 10 applies force to the tensioner arm 24, which, in turn, transfers the force to the chain 22 to control tension of the chain 14 to prevent noise and chain slippage and to otherwise provide good chain control.

Figure 2:
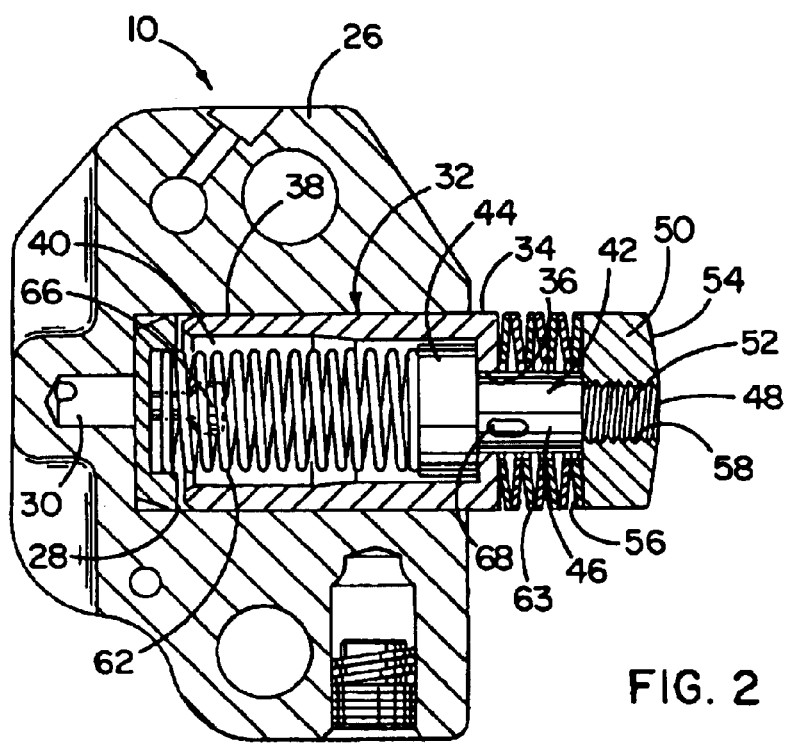
FIG. 2 is a cross-sectional view of the tensioner of FIG. 1 showing the internal components of the tensioner with the pressure relief valve of the present invention in a closed position.
Figure 2A:
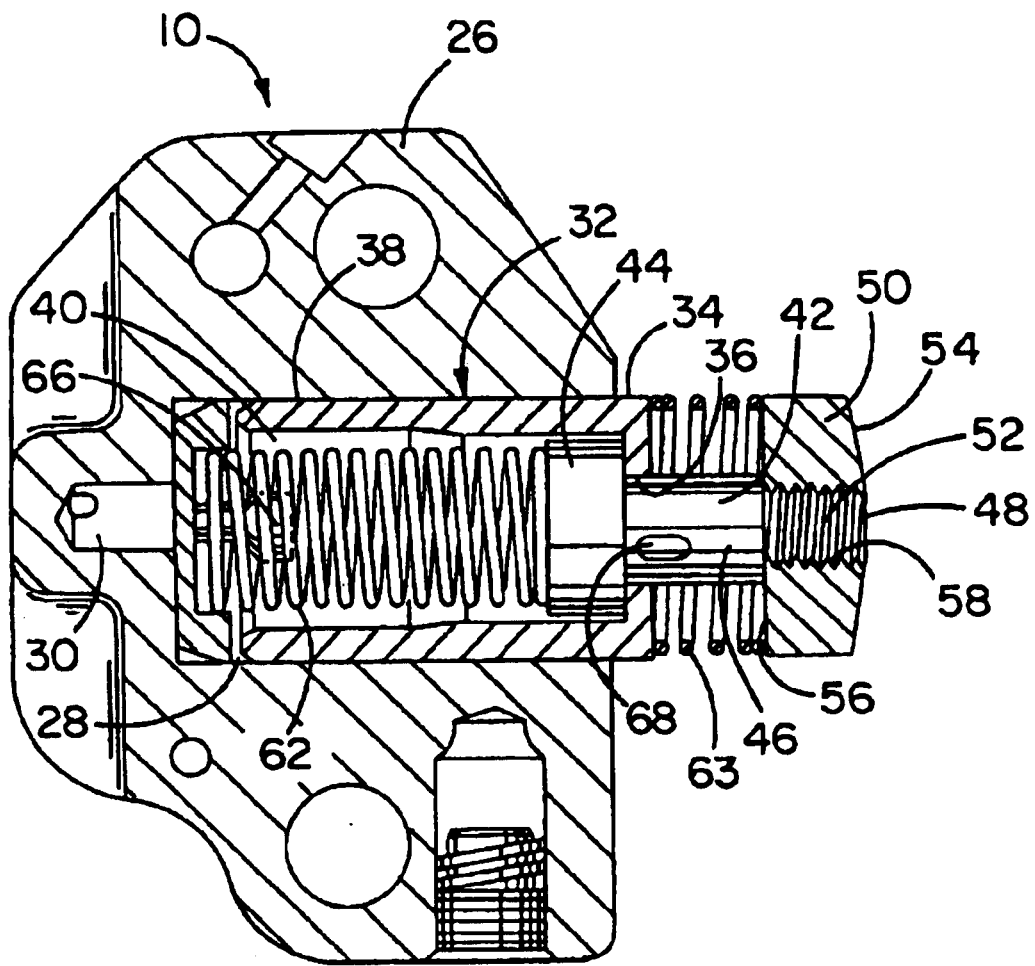

With reference to FIG. 2, the tensioner 10 includes a housing 26 defining a bore 28 generally at the center of the housing 26, which is filled with fluid (such as hydraulic fluid) flowing through a passageway 30 from a pressurized fluid source (not shown). The fluid source may be an oil pump or a reservoir. The housing 26 receives a primary piston 32 being hollow and forming a fluid chamber 40 with the bore 28. The primary piston 32 includes an upper end 34 with a with a circular aperture 36. A secondary piston 42 includes a base portion 44 and a shaft portion 46 extending from the base portion 44. The base portion 44 is located in the chamber 40 at the upper end 34 of the primary piston 32. The diameter of the base portion 44 is larger than that of the circular aperture 36 of the primary piston 32. The primary piston 32 and the secondary piston 42 are capable of moving independent of one another.

The shaft portion 46 includes a terminal end 48 and extends through the aperture 36 of the primary piston 32 to locate the terminal end 48 away from the primary piston 32 a predetermined distance to accommodate the pre-loaded biasing system 14. A nose piece 50 is affixed to a threaded portion 52 of the shaft portion 46 adjacent the terminal end 48. The nose piece 50 includes a curved top surface 54 that engages the tensioner arm 24 (or the chain or belt when no tensioner arm is used) to provide tension along the chain 22. The nose piece 50 includes a flat bottom surface 56 and defines a centrally located bore 58 extending inward from the bottom surface 56 and may extend entirely through the nose piece 50. The bore 58 is threaded to cooperate with the threaded portion 52 of the shaft portion 46 to affix the nose piece 50 to the secondary piston 42.

A primary spring 62 extends between the bottom of the bore 28 in the housing 26 and the base portion 44 of the secondary piston 42. The primary spring 62 biases the base portion 44 into engagement with the upper end 34 of the primary piston 32 about the circular aperture 36 to, in turn, bias the primary piston 32 in an outward direction relative to the housing 26. The primary spring may be a coil spring.

The pre-loaded biasing system 14 includes a spring or spring-like structure 63 between the upper end 34 of the primary piston 32 and the bottom 56 of the nose piece 50. The spring 63 surrounds the shaft portion 46 of the secondary piston 42 and biases the nose piece 50 away from the upper end 34 of the primary piston 32. The spring 63 is pre-loaded a predetermined amount such that the secondary piston does not move independent of the primary piston 32 until a predetermined operating load on the nose piece 50 is achieved. The predetermined operating load is normally near or at the maximum limit of the prescribed range of operation for the tensioner.

The spring 63 is preferably one or more compression coil springs or stacked Belleville washers, which provide a known relationship between force and displacement. The spring of the pre-loaded biasing system, however, is not necessarily limited to any particular biasing device and, accordingly, can include any structure with the appropriate resistance to motion within a proper stroke range, including, for example, rubber bumpers, wave springs and compressed air.

A check valve 66 is provided between the fluid chamber 40 and the fluid passageway 30 to permit fluid flow into the chamber 40, while blocking fluid flow in the reverse direction. The check valve 66 may be a conventional check valve that, for example, includes a ball and spring wherein the pressure in the chamber overcomes the spring to bias the ball toward a ball seat to prevent flow from the chamber into the passageway. The check valve may be as shown and described U.S. Pat. No. 5,259,820 and U.S. Pat. No. 5,277,664, both of which are owned by the assignee of the present application and both of which are incorporated herein by reference for purposes of disclosing acceptable check valve structures.

During start-up, fluid passes through the passageway 30 under pressure and opens the check valve 66 to enter the chamber 40 of the tensioner 10. As fluid fills the chamber 40, the primary piston 32 moves outward under the rising pressure of the fluid in the chamber 32 and the bias of the primary spring 62. The primary piston 32 continues to move outward of the bore 28 until the return force of the chain 22 on the nose piece 50 balances the combined force of the pressurized fluid and the primary spring. When the balance occurs, the check valve 66 closes and prevents further fluid flow into or out of the chamber 40. When the slack increases (or tension decreases) in the chain 22 (or belt, as it may be) due, for example, to wear or load fluctuations, imbalance occurs again and the check valve 66 re-opens to allow more fluid into the chamber 40, moving the primary piston 32 outward again.

As mentioned above, the spring 63 of the pre-loaded biasing system 14 is in compression between the upper end 34 of the primary piston 32 and the nose piece 50 and acts as a high force relief system. When tension from the chain increases (such as due to thermal expansion) and forces the nose piece 50 downward toward the primary piston 32, the fluid pressure in the fluid chamber 40 correspondingly increases. This increased pressure against the check valve 66 prevents fluid flow from the chamber 40. As the pressure in the fluid chamber 40 increases beyond a predetermined maximum value, the force applied to the nose piece 50 will overcome the bias of the spring 63 and force the spring 63 to compress. This occurs when the operating load exceeds a predetermined value as it approaches the maximum value of the prescribed range for the tensioner 10. As a result, the nose piece 50 will move inward with respect to the primary piston 32, and consequently, the secondary piston 42 will move independently of the primary piston 32 to accommodate these increased operating loads This is described in further detail in commonly owned U.S. Pat. No. 5,993,342, which is incorporated by reference herein.

The drive system is capable, in some instances, of producing operating loads beyond the realistic prescribed range for the tensioner. Thus, the pre-loaded biasing system is not able to handle these excessive operating loads. These excessive operating loads can damage components of the drive system and interfere with its intended function of the chain drive system. Thus, the tensioner 10 is provided with the pressure relief system 16 to quickly and temporarily relieve pressure from the chamber 28 of the tensioner 10.

The pressure relief system 16 operates in the manner of a slide valve type formed between the upper end 34 of the primary piston 32 and the shaft portion 46 of the secondary piston 42. More specifically, the shaft portion 46 of the secondary piston 42 defines an elongated recess 68 adjacent the base portion 44 along the shaft portion 46.

Figure 4:
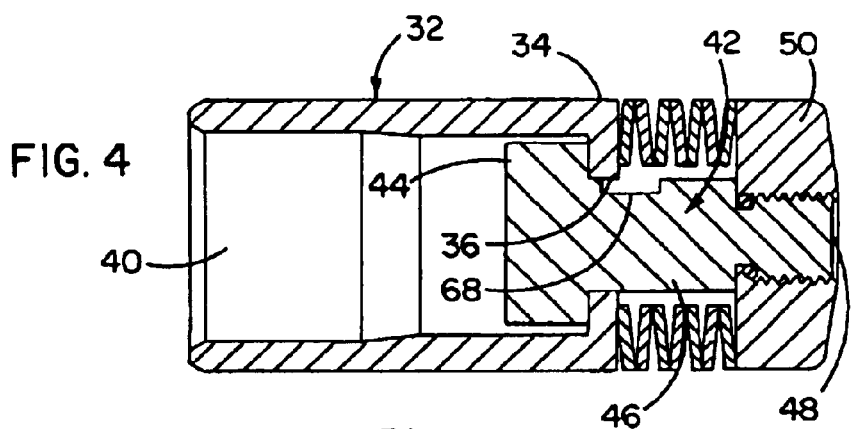
FIG. 4 is a cross-sectional view of a primary piston and secondary piston of the tensioner of FIG. 2 also illustrating the pressure relief valve in the closed position.

As illustrated in FIGS. 2 and 4, the elongated recess is in the closed position. That is, the recess 68 does not extend across the circular aperture 36 of the primary piston 32. Thus, fluid cannot escape through the circular aperture 36 from the chamber 40 when the tensioner 10 is operating within its prescribed range of operating loads. Thus, when the valve is in a closed position, the pressure relief system 16 is also in a closed state.

Figure 3:
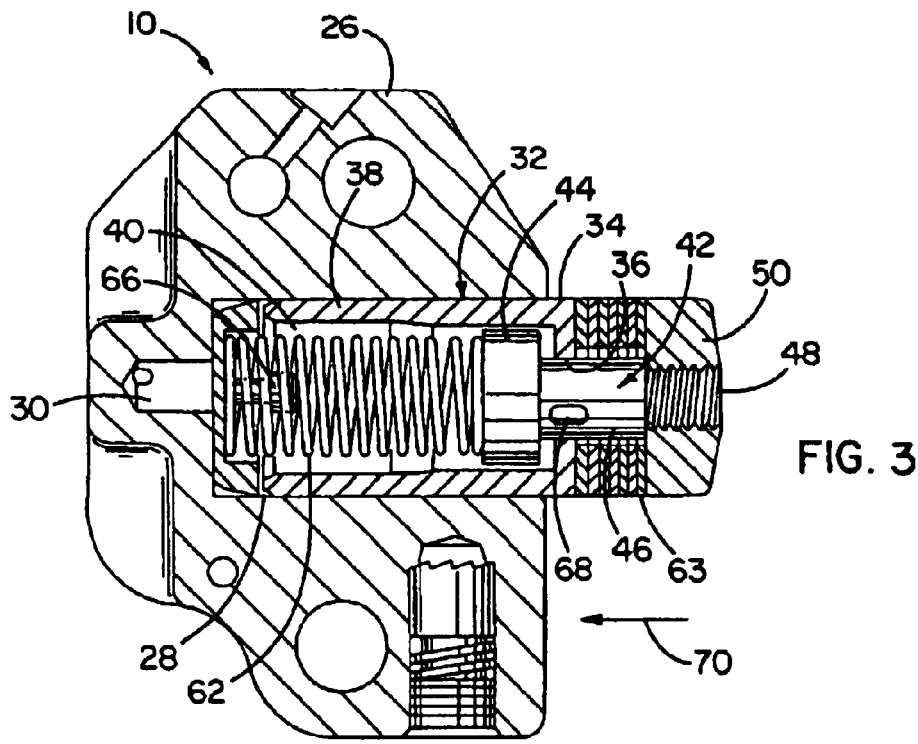
FIG. 3 is a cross-sectional view of the tensioner of FIG. 2 illustrating the pressure relief valve of the present invention in an open position.
Figure 5:
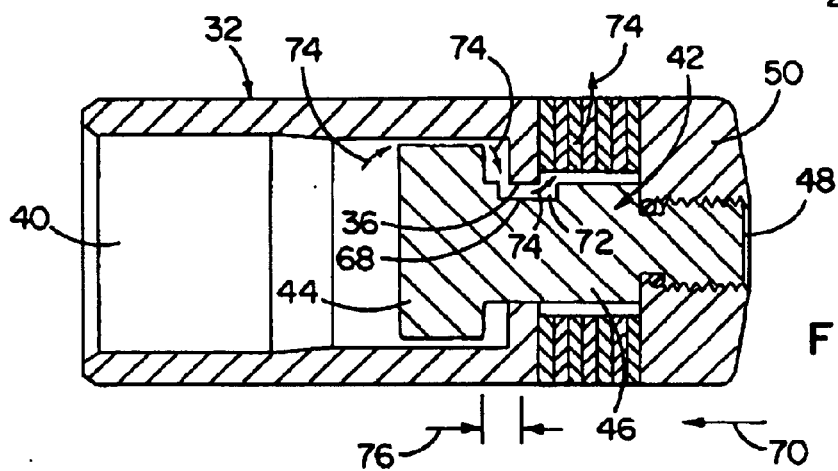
FIG. 5 is a cross-sectional view of the primary piston and secondary piston of the tensioner of FIG. 3 also illustrating the pressure relief valve in the open position.

As illustrated in FIGS. 3 and 5, when the operating loads exerted by the chain or belt on the nose piece 50 exceed the maximum limit of the prescribed range, the secondary piston 42 overcomes the pressure of the hydraulic fluid and bias of the primary spring 62 to slide independently toward the primary piston 32, as indicated by reference number 70. As a result, the elongated recess 68 slides so to extend across the circular aperture 36 in the upper end 34 of the primary piston 32 to create a passageway 72 for fluid to escape from the chamber. This fluid flows the path indicated by the arrows with reference number 74. The elongated recess 68 extends in the longitudinal direction of the secondary piston 42. The length, width and depth of the recess are to be coordinated to create a sufficiently sized passageway to achieve the desired quick and temporary pressure relief for the particular tensioner and its application.

For example, the length is relatively short compared to the length of the secondary piston 42 and should be about twice the thickness of the upper end 34 of the primary piston 32 defining the circular aperture 36. The circumferential width of the elongated recess 68 is significantly less than the length. The depth and width of the recess 68 should provide an area of about one half the check valve flow area. This recess area must insure sufficient flow from the chamber 40 to reduce chamber pressure to near or below the pressure in the inlet 30. The sooner refill and tensioning recovers providing system control, the better.

During operation, the pressure relief system 16 will only operate for a short time due to its location at the top area of the primary piston 32, and the relatively short stroke (indicated by reference numeral 76) necessary to open and close the elongated recess 68. The location of the elongated recess 68 at the lower end of the shaft portion 46 and at the opening 36 of the primary piston 32 provides a reliable pressure relief system that acts smoothly and effectively in extreme situations. As soon as the operating loads decrease into the prescribed operating range, the check valve 66 will open and pressurized fluid will flow back into the chamber 40. As a result, the primary piston 32 will move outwardly and again apply pressure to control the chain 22 or belt. Thus, the tensioner 10 will assume normal operation.

While there have been described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A hydraulic tensioner comprising:

a housing defining a bore;

a primary piston slidably received within the bore, the primary piston defining a fluid chamber with the bore and having a lower end defining a first opening and an supper end defining a second opening;

a secondary piston extending through the second opening of the primary piston and having a base portion and an upper end portion, the base portion being slidably received in the fluid chamber, the upper end portion being spaced from the base portion and the primary piston, and the secondary piston being permitted to move axially with respect to the primary piston;

a first biasing member located within the bore to bias the primary piston outwardly of the bore;

a second biasing member located between the primary piston and the upper end portion of the secondary piston to bias the secondary piston away from the primary piston and outwardly relative to the bore;

a first valve provided between the fluid chamber and a source of pressurized fluid to permit fluid flow into the chamber while blocking flow in the reverse direction;

a passage in the housing to connect the fluid chamber with the source of pressurized fluid; and a second valve discharges fluid flow from the chamber through the second opening of the primary piston to reduce hydraulic pressure in the chamber when the secondary piston moves axially towards the primary piston and inwardly relative to the bore a predetermined stroke amount due to operating loads acting on the tensioner exceeding a maximum limit of a prescribed range for the tensioner.

2. The hydraulic tensioner of claim 1 wherein the second biasing member is compressed a predetermined amount when interposed between the primary piston and the upper end portion of the secondary piston, the second biasing member being further compressed when the operating load on the secondary piston exceeds a predetermined amount within the prescribed range of operation.

3. The hydraulic tensioner of claim 2 wherein the second valve further comprises a recess defined by a portion of the secondary piston between the base portion and the upper end portion, the second valve being in an open position when the recess is located across the second opening of the primary piston when the operating load on the secondary piston moves the piston axially toward the primary piston the predetermined stroke amount due to operating loads exceeding the maximum limit of the prescribed range of operation so to discharge fluid from the chamber to reduce hydraulic pressure in the chamber.

4. The hydraulic tensioner of claim 3 wherein the secondary piston is capable of moving axially to close the second valve by moving the recess so that it is not located across the second opening of the primary piston under the pressure of fluid flow into the chamber and the bias of the first and second biasing members when the operating loads are below the maximum limit of the prescribed range for the tensioner.

5. The hydraulic tensioner of claim 4 further comprising a nose piece attached to the upper end portion of the secondary piston, the second biasing member being interposed between the primary piston and the nose piece.

6. The hydraulic tensioner of claim 3 wherein the first biasing member is a coil spring interposed between the upper end of the primary piston and the housing to bias the primary piston outward of the housing.

7. The hydraulic tensioner of claim 3 wherein the second biasing member is a coil spring interposed between the upper end portion of the secondary piston and the upper end of the primary piston to bias the secondary piston away from the primary piston.

8. The hydraulic tensioner of claim 3 wherein the second biasing member comprises a plurality of Belleville washers interposed between the upper end portion of the secondary piston and the upper end of the primary piston to bias the secondary piston away from the primary piston.

9. The hydraulic tensioner of claim 3 wherein the second biasing member comprises resilient material interposed between the upper end portion of the secondary piston and the upper end of the primary piston to bias the secondary piston away from the primary piston.

10. The hydraulic tensioner of claim 1 wherein the tensioner applies a tension to a chain or belt system and the secondary piston moves axially relative to the primary piston in response to changes in tension in the chain or belt system.

11. A hydraulic tensioner comprising:

a housing defining a bore;

a primary piston slidably received within the bore, the primary piston defining a fluid chamber with the bore and having a lower end defining a first opening and an upper end defining a second opening;

a secondary piston extending through the second opening of the primary piston and having a base portion and an upper end portion, the base portion being located in the primary piston, the upper end portion being spaced from the base portion and the primary piston, and the secondary piston being permitted to move axially with respect to the primary piston;

a first biasing member located within the bore to bias the primary piston outwardly of the bore;

a second biasing member located between the primary piston and the upper end portion of the secondary piston to bias the secondary piston away from the primary piston, the second biasing member compressed a predetermined amount when interposed between the primary piston and the upper end portion of the secondary piston, the second biasing member being further compressed when operating load on the secondary piston exceeds a predetermined amount within a prescribed range of operation;

a nose piece attached to the upper end portion of the secondary piston, the upper end portion of the secondary piston having a threaded portion and the nose piece defines a bore with internal threading that complements the threaded upper end portion for attaching the nose piece to the upper end portion of the secondary piston, the second biasing member being interposed between the primary piston and the nose piece;

a first valve provided between the fluid chamber and a source of pressurized fluid to permit fluid flow into the chamber while blocking flow in the reverse direction;

a passage in the housing to connect the fluid chamber with the source of pressurized fluid; and a second valve discharges fluid flow from the chamber through the second opening of the primary piston to reduce hydraulic pressure in the chamber when the secondary piston moves axially towards the primary piston a predetermined stroke amount due to the operating loads acting on the tensioner exceeding a maximum limit of the prescribed range for the tensioner, the second valve having a recess defined by a portion of the secondary piston between the base portion and the upper end portion, the second valve being in an open position when the recess is located across the second opening of the primary piston when the operating load on the secondary piston moves the piston axially toward the primary piston the predetermined stroke amount due to the operating loads exceeding the maximum limit of the prescribed range of operation so to discharge fluid from the chamber to reduce hydraulic pressure in the chamber, the secondary piston capable of moving axially to close the second valve by moving the recess so that it is not located across the second opening of the primary piston under the pressure of fluid flow into the chamber and the bias of the first and second biasing members when the operating loads are below the maximum limit of the prescribed range for the tensioner.

12. A hydraulic tensioner for applying a tension to a chain or belt in a chain or belt system, the tensioner comprising:

a housing defining a bore;

a primary piston slidably received within the bore, the primary piston defining a fluid chamber with the bore and having a lower end defining a first opening and an upper end defining a second opening;

a secondary piston having a base portion and an upper end portion, the base portion being slidably received in the fluid chamber, the upper portion being spaced from the base portion and the primary piston, and the secondary piston being permitted to move axially with respect to the primary piston in response to tension changes in the chain or belt;

a first biasing member located within the bore to bias the primary piston outwardly of the bore;

a second biasing member located between the primary piston and the upper end portion of the secondary piston to bias the secondary piston away from the upper end of the primary piston;

a first valve provided between the fluid chamber and a source of pressurized fluid to permit fluid flow into the chamber while blocking flow in the reverse direction;

a passage in the housing to connect the fluid chamber with the source of pressurized fluid; and a second valve discharging fluid flow from the chamber through the second opening of the primary piston to reduce hydraulic pressure in the chamber when the secondary piston moves axially towards the upper end of the primary piston a predetermined stroke amount due to tension changes in the chain or belt acting on the tensioner exceeding a maximum limit of a prescribed range for the tensioner.

13. A hydraulic tensioner comprising:

a housing defining a bore;

a primary piston slidably received within the bore, the primary piston defining a fluid chamber with the bore and having a lower end defining a first opening and an upper end defining a second opening;

a secondary piston extending through the second opening of the primary piston and having a base portion and an upper end portion, the base portion being slidably received in the fluid chamber, the upper end portion being spaced from the base portion and the primary piston, and the secondary piston being permitted to move axially with respect to the primary piston;

a first biasing member located within the bore to bias the primary piston outwardly of the bore;

a second biasing member located between the primary piston and the upper end portion of the secondary piston to bias the secondary piston away from the primary piston;

a first valve provided between the fluid chamber and a source of pressurized fluid to permit fluid flow into the chamber while blocking flow in the reverse direction;

a passage in the housing to connect the fluid chamber with the source of pressurized fluid; and a second valve discharges fluid flow from the chamber through the second opening of the primary piston to reduce hydraulic pressure in the chamber when the secondary piston moves axially towards the primary piston a predetermined stroke amount due to operating loads acting on the tensioner exceeding a maximum limit of a prescribed range for the tensioner, the second biasing member being responsive to operating loads acting on the tensioner when the secondary piston moves axially towards the primary piston a stroke amount less than the predetermined stroke amount.

* * * * *